(12) United States Patent
Hendren, III (10) Patent No.: US 6,353,855 B1
(45) Date of Patent: Mar. 5, 2002

(54) PROVIDING A NETWORK COMMUNICATION STATUS DESCRIPTION BASED ON USER CHARACTERISTICS

(75) Inventor: C. Hudson Hendren, III, Strasburg, VA (US)

(73) Assignee: America Online, Dulles, VA (US)

( * ) Notice: Subject to any disclaimer, the term of this patent is extended or adjusted under 35 U.S.C. 154(b) by 0 days.

(21) Appl. No.: 09/259,696

(22) Filed: Mar. 1, 1999

(51) Int. Cl.[7] .............................................. G06F 15/16
(52) U.S. Cl. ......................... 709/228; 709/220; 370/10
(58) Field of Search ................................ 709/220, 222, 709/228, 238, 227; 112/470.04; 370/10

(56) References Cited

U.S. PATENT DOCUMENTS

| | | | | |
|---|---|---|---|---|
| 5,867,665 A | * | 2/1999 | Butman et al. | 709/238 |
| 6,076,109 A | * | 6/2000 | Kikinis | 709/228 |
| 6,161,134 A | * | 12/2000 | Wang et al. | 709/220 |
| 6,216,618 B1 | * | 4/2001 | Glodberg et al. | 112/470.04 |

FOREIGN PATENT DOCUMENTS

WO    WO 97/18516    5/1997    ........... G06F/17/28

OTHER PUBLICATIONS

Apache HTTP Server Version 1.3 Using XSSI and Error-Document to configure customized international server responses http://www.apache.org/docs/misc/custom error-docs.html, p. 1–8.

* cited by examiner

*Primary Examiner*—Ayaz Sheikh
*Assistant Examiner*—Khanh Quang Pinh
(74) *Attorney, Agent, or Firm*—Fish & Richardson P.C.

(57) ABSTRACT

Methods and systems for providing a network communication status description based on user characteristics. The techniques receive a status indication from a first networked computer in response to a user's request for information and determine one or more characteristics of the user who issued the request. The techniques provide a status description based on the status indication and the determined characteristics of the user (e.g., a preferred language).

22 Claims, 7 Drawing Sheets

HTTP Status Code Categories

| Status Code Category | Status Code Numbers | Description |
|---|---|---|
| Informational | 100-199 | Application-specific messages. |
| Successful | 200-299 | The request was successfully processed. |
| Redirection | 300-399 | The client needs to initiate further action in order to process the request. This is often done by the client without the user's knowledge. |
| Client Error | 400-499 | Client-side problems. |
| Server Error | 500-599 | Server-side problems. |

FIG. 4

HTTP Status Code Descriptions

| Status Code | Description |
|---|---|
| 200 OK | No error, the request succeeded. |
| 201 Created | The POST request has been fulfilled. |
| 202 Accepted | The asynchronous request was received. The request has been accepted but not necessarily acted upon. |
| 204 No Content | The request succeeded, but there is nothing for the client to display; this is useful meta-information for responses that do not need to be displayed to the user. |
| 300 Multiple Choices | The requested resource is available from multiple locations. The list of choices is returned in the response. The server's preferred choice is included in the Location field in the response. |
| 301 Moved Permanently | The requested URL has permanently moved to a new URL (specified in the Location field in the response); all subsequent references to this resource should use the new URL. |
| 302 Moved Temporarily | The requested URL has temporarily moved to a new URL (specified in the Location field in the response); subsequent references to this resource should continue to use the original URL. |
| 304 Not Modified | The conditional GET request worked; however, the document has not been modified since the date in the If-Modified-Since field. |
| 400 Bad Request | The request was not understood; the client should send an updated request. |
| 401 Unauthorized | If this was an anonymous request, it must be authenticated; if it was an authenticated request, it was denied. |
| 403 Forbidden | The server is unwilling to grant the request, often due to invalid authorization. |
| 404 Not Found | The server did not find a specific URL. |
| 500 Internal Server Error | An unexpected server error has occurred. |
| 501 Not Implemented | The server does not support this request. |
| 502 Bad Gateway | The proxy/gateway server has received an invalid response from the server it contacted. |
| 503 Service Unavailable | The server is temporarily unable or unwilling to handle the request; this is normally due to server overload or maintenance. |

PROVIDING A NETWORK COMMUNICATION STATUS DESCRIPTION BASED ON USER CHARACTERISTICS

TECHNICAL FIELD

This invention relates to providing a network communication status description based on user characteristics.

BACKGROUND

Networks such as the Internet enable users all over the world to share information. For example, a Web-browser (e.g., Microsoft® Internet Explorer®) can retrieve web-pages from computers in almost any country. Such networks typically require network nodes (e.g., computers) to share a protocol that defines how the network nodes communicate. For example, computers on the Internet commonly communicate using HTTP (HyperText Transfer Protocol). HTTP defines messages that a client (e.g., a browser) can send to request information from a server. HTTP also defines messages that the server uses to send back the requested information. The HTTP messages typically travel through a number of intervening agents (e.g., proxies, routers, and firewalls) en route to their destinations.

As many "web-surfers" have experienced, obtaining information over a network is not always trouble-free. For example, information a user seeks may have been moved to a different computer. Additionally, the computer storing the information may be temporarily unable to provide the requested information, for example, when the computer receives too many requests at the same time.

A server can supply an error message for display by a browser or other client. For example, many Web users may have encountered a "404—File Not Found" error message during a browsing session. Unfortunately, error messages can be very technical and, therefore, have little meaning for novice computer users. Additionally, while network nodes in different countries share a communications protocol, computer users still speak a wide variety of languages. Thus, an error message in English is of little value to someone who only speaks French. A server administrator can configure a server to provide error messages in different languages.

SUMMARY

In general, in one aspect, a method of providing a network communication status description based on user characteristics includes receiving a status indication from a first networked computer in response to a user's request for information and determining one or more characteristics of the user who issued the request. The method provides a status description corresponding to the received status and the determined user characteristics.

Embodiments may include one or more of the following features. The method may further include transmitting the status description to a second networked computer.

The status indication may indicate the success or failure of the user's request. The status indication may be a status code such as an HTTP (HyperText Transfer Protocol) status code.

User characteristics may include technical proficiency. The technical proficiency may be inferred, for example, by basing the proficiency on a user's previous request or requests for information.

User characteristics may include one or more preferred languages. The preferred languages may be inferred, for example, by determining a user's address or access number used.

The status description may include text and/or speech data. The status description may include graphics, video, animation, sound, and instructions. The status description may be selected from a database of status descriptions.

In general, in another aspect, a method of providing a network communication status description based on user characteristics includes-receiving an HTTP (HyperText Transfer Protocol) status code from a first networked computer in response to a user's HTTP request for a URL (Universal Resource Locator) provided by the first networked computer. The method also includes determining one or more characteristics of the user who issued the request, selecting a status description from a database of status descriptions based on the received HTTP status code and the determined user characteristics, and transmitting the status description to a second networked computer.

In general, in another aspect, a proxy for providing a network communication status description based on user characteristics includes means for receiving a status code from a first networked computer in response to a user's request for information, means for determining one or more characteristics of the user who issued the request, means for selecting a status description from a database of status descriptions based on the received status code and the determined user characteristics, and means for transmitting the status description to a second networked computer.

Advantages may include one or more of the following. By transmitting a status description in a user's preferred language(s), a user can quickly understand problems that occurred when the user requested information and can try to remedy these remedy problems. By centralizing status descriptions in an intervening agent instead of duplicating the descriptions at different servers offering information, the servers need not waste processing time providing tailored status descriptions and need not provide storage for a large number of status descriptions. By providing status descriptions based on a user's technical proficiency, the techniques can provide a user with information likely to be of value to the user.

The details of one or more embodiments of the invention are set forth in the accompanying drawings and description below. Other features, objects, and advantages of the invention will be apparent from the description and drawings, and from the claims.

DRAWING DESCRIPTIONS

FIG. 4 is a table of HTTP status categories.

FIG. 5 is a table of HTTP status codes.

Like reference numbers and designations in the various drawings indicate like elements.

DETAILED DESCRIPTION

Figure 1:
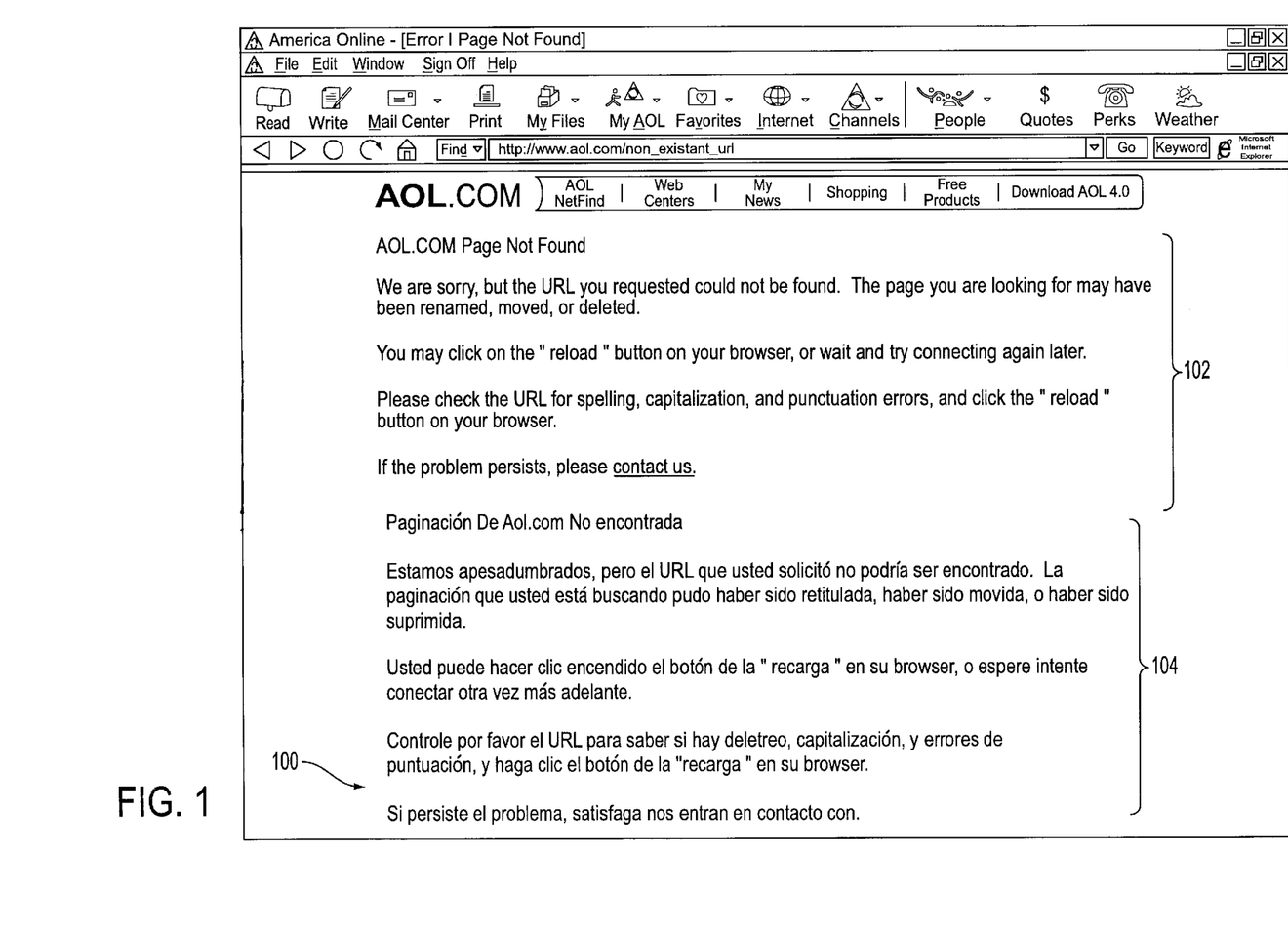
FIG. 1 is a screenshot of a display that includes a status description in a user's preferred language.

Referring to FIG. 1, user requests for information (e.g., web-pages) from a network node can fail for a variety of reasons. For example, a user requesting an HTML (HyperText Markup Language) page stored on a remote computer on the World Wide Web may have mistyped a URL (Universal Resource Locator) identifying the page.

As shown in FIG. 1, a user's request for information has failed. A browser display 100 includes a status description 102 (e.g., text, graphics, video, animation, links, and sounds) explaining the cause of failure of the user's information request. The display 100 also includes an appended status description 104 based on the user's characteristics. As shown, the appended status description 104 is in a user's preferred language (e.g., English, German, French, Spanish, or Chinese). By providing status descriptions in a language more readily understood by a user, the user can quickly comprehend and try to remedy problems in retrieving requested information. For example, a user can identify typographical errors in an entered URL and transmit an information request with a corrected URL.

The tailored status description 104 can be provided based on different user characteristics such as the preferred language(s) of the user and/or the user's technical proficiency. For example, the status description 104 may simply state "HTTP Protocol Error: 404" to a very sophisticated user, but state "The file you entered doesn't exist. Look for typos and try re-entering the location" to less experienced users. Descriptions provided to less experienced users may also include HyperText links or technical support telephone numbers for providing further assistance. By displaying a status description based on the user's technical proficiency, even users with little experience can quickly receive assistance.

Figure 2:
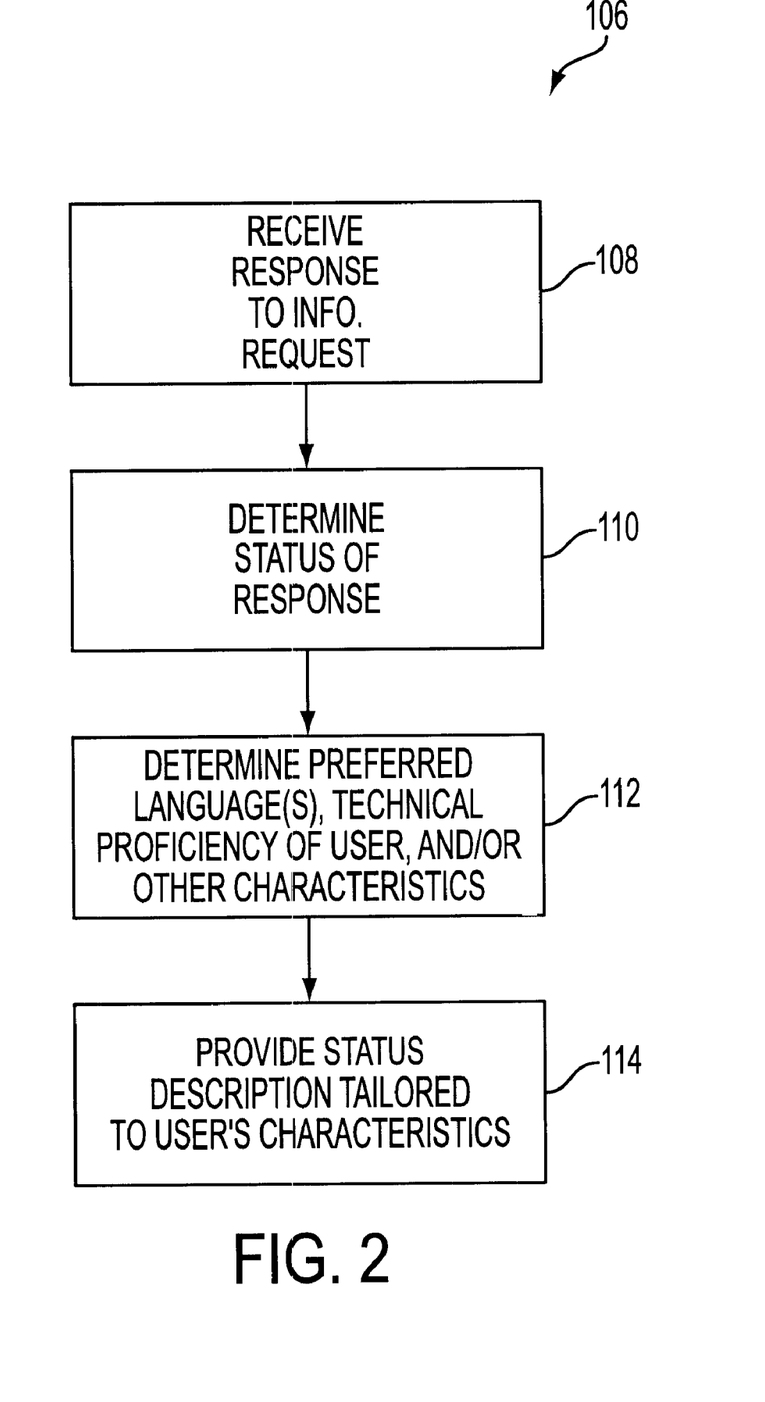
FIG. 2 is a flowchart of a process for providing a status description in a user's preferred language.

Referring to FIG. 2, a process 106 for providing status descriptions based on a user's characteristics can include examining a server's response to an information request to determine 110 the status (e.g., the success or cause of failure) of the request. The process 106 also determines 112 characteristics of the user making the request. For example, the process 106 can determine the preferred language(s) and technical proficiency of the user. Based on the determined status and user characteristics, the process 106 can provide a status description that corresponds the user characteristics. The status description may be in a variety of formats such as HTML, XML (Extensible Markup Language), JPEG (Joint Picture Experts Group), MPEG (Moving Pictures Experts Group), etc. The provided status description can replace or be provided in addition to (e.g., appended or prepended) any status descriptions provided by the server that processed the information request.

Figure 3:
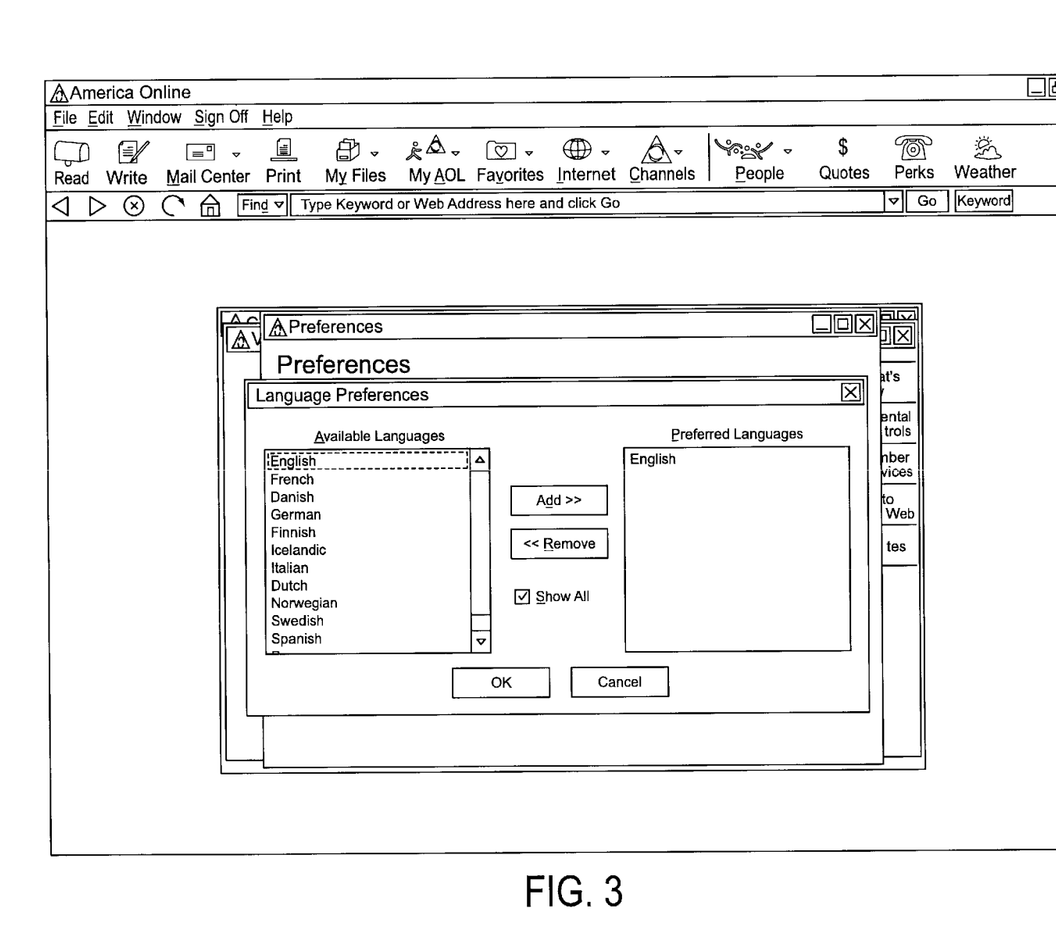
FIG. 3 is a screenshot of a graphical user interface for specifying a user's preferred language(s).

The process 106 can determine 112 the preferred language of a user in a variety of ways. For example, HTTP provides a "response-language" field in HTTP information requests. The response-language field can include an ordered list of ANSI-coded indications of the user's native language. For example, an ANSI-coded list of "1, 0, 2" corresponds to a preference list of "French", "English", and "Danish". The user can define the contents of the response-language field by interacting with a browser user-interface. For example, a user can tailor Microsoft® Internet Explorer® by navigating through "Edit", "Internet Options", "General", "Languages" and entering different preferred languages. These entries are transmitted in each HTTP request. Referring to FIG. 3, America Online® provides users with the ability to declare a preferred language and stores the user's response in a database.

Alternatively, a user's preferred language can be inferred by identifying the access number dialed by a user to connect to a network or by accessing a user's billing or accounting information. Pending application "Data Localization", filed Dec. 22, 1998 (PCT/US/27217) describes methods of inferring characteristics of a user and is incorporated herein.

A user's technical proficiency can also be determined in a variety of ways. For example, a user can self report their abilities. Alternatively, technical proficiency can be inferred, for example, by tracking a user's success rate in obtaining information over a network (e.g., how many errors does a user accumulate when trying to access web-pages).

Referring to FIGS. 4 and 5, HTTP and other network communication protocols define status codes that describe the success or failure of network communications. These codes describe errors, application-specific messages, whether a request has been redirected, etc. These codes are transmitted in response to problems encountered in retrieving and transmitting requested information. For example, an HTTP response message includes a "status-code" field that includes a numeric representation of the status. By examining the status-code of a response message, the process of FIG. 2 can determine which status description to provide. For example, if an HTTP response message is received having a "status-code" field equal to "401", the process can provide a status description that explains that the request was not "authenticated." Less experienced users may not know what "authenticated" means and the process can provide a less technical description.

Figure 6:
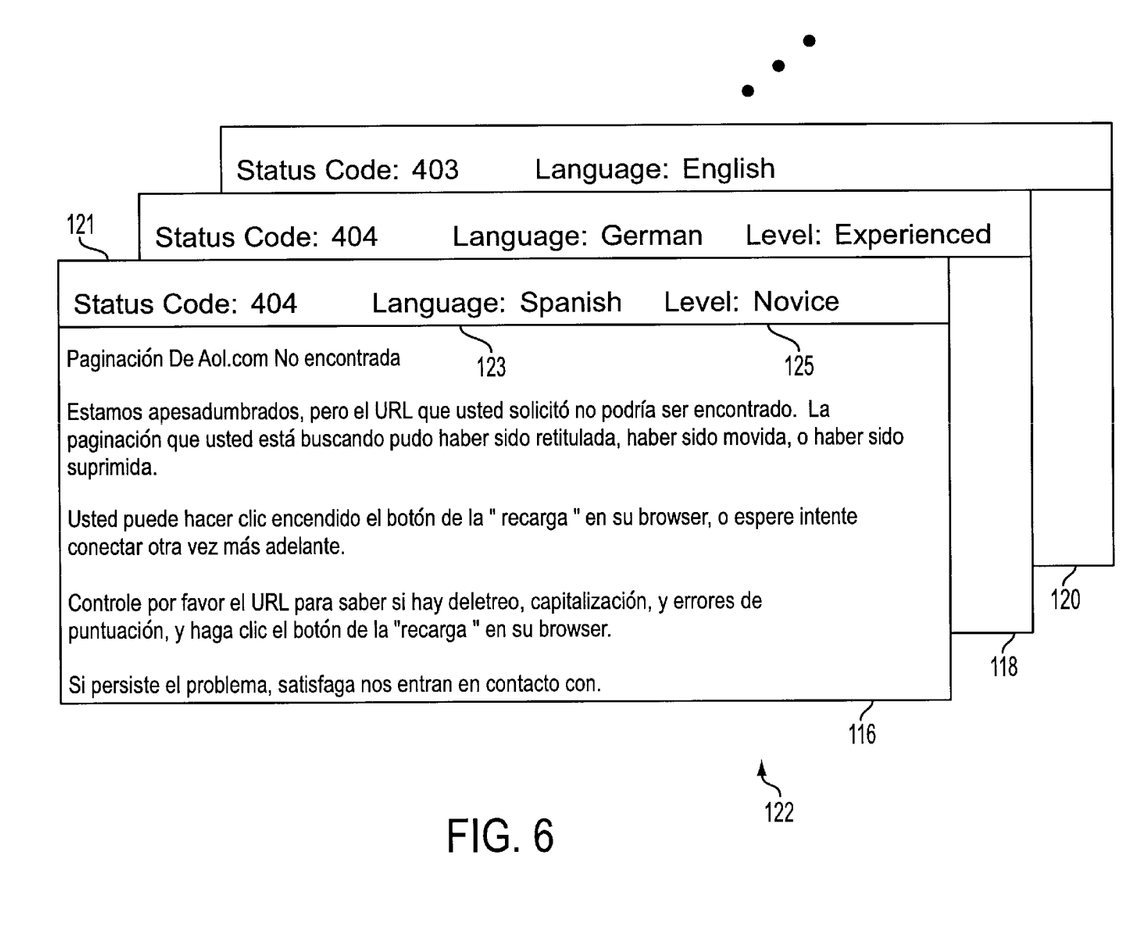
FIG. 6 is a diagram illustrating storage of status information.

Referring to FIG. 6, a status description database 122 includes status information for each status code 121 in a variety of different languages 123. The database 122 also stores multiple descriptions for the same language and status code that differ in the level of technical information provided 125. The database 122 enables a system to quickly retrieve a status description tailored to a user. As shown, database 122 records are keyed by status code 121, ANSI language value 123, and technical proficiency 125 (e.g., "novice", "experienced", and "expert"). A wide variety of other data storage techniques could similarly provide quick and easy access to a description.

In addition to or in lieu of a database, an intervening agent or client can use language translation software that translates text from one language to another. For example, SysTrans® can automatically translate text from English to Spanish. Using a database of pre-written information, however, can speed processing and avoid garbled sentences sometimes produced by translation software. Additionally, the use of translation software would not be helpful in the cases where a server only responded with a status code and did not provide a status description.

Figure 7:
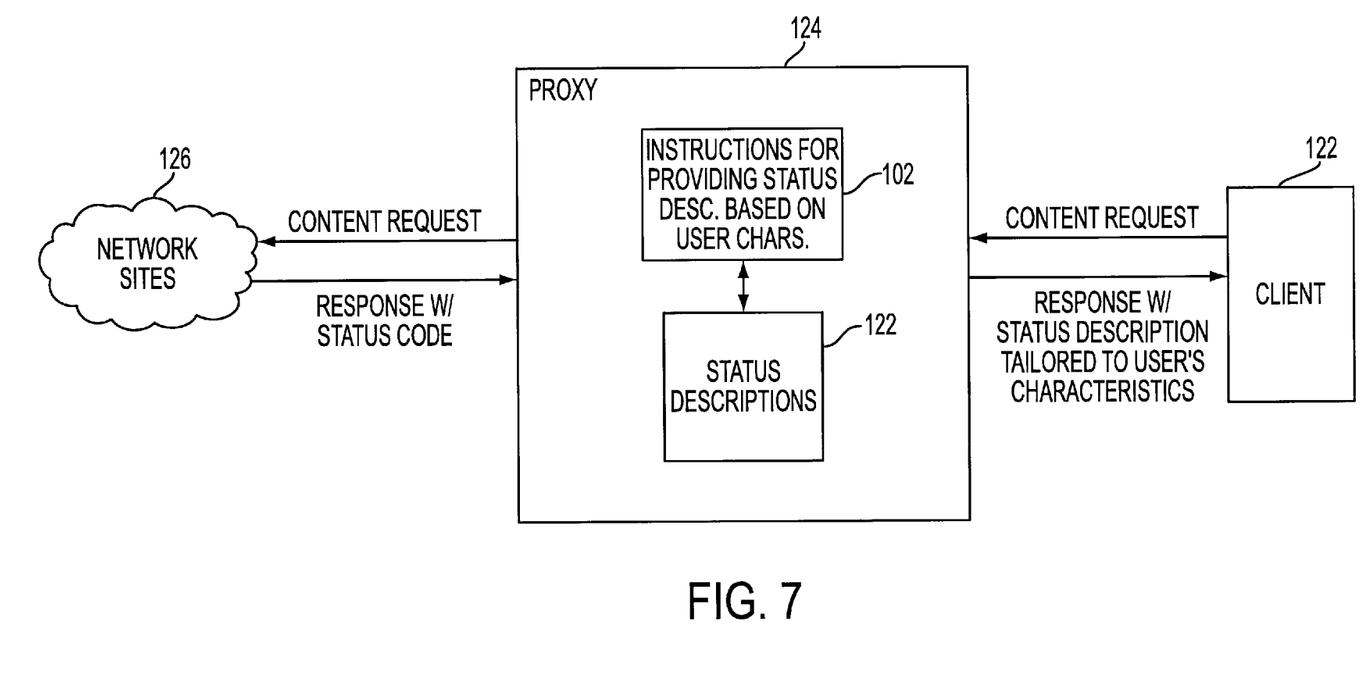
FIG. 7 is a diagram of a proxy that provides status information in a user's preferred language.

Referring to FIG. 7, including instructions that provide a status description based on user characteristics 102 in a proxy 124 or other intervening agent enables the agent to provide tailored status descriptions for information requests that travel through the agent 124. This alleviates the need for each server offering information to store a large number of different status descriptions (e.g., [number of statuses]×[number of languages supported]×[number of different levels of technical explanation]×[average size of description]). Additionally, centralization of the processing instructions can eliminate the need for installing status descriptions in each client.

As shown in FIG. 7, when a client 122 issues an information request, the proxy 124 (e.g., an Internet Service Provider such as America Online®) forwards the request to a network server providing the requested information 126. When the proxy 124 receives the response from the network server, the proxy 124 can determine the status of the information request. If the response indicates successful operation, the proxy 124 can forward the received response to the client unaltered. Otherwise, the proxy 124 can determine one or more languages understood by a user, the user's technical proficiency, and other user characteristics to select a pre-written status description from a database 122 and transmit the selected description to the client.

Figure 8:
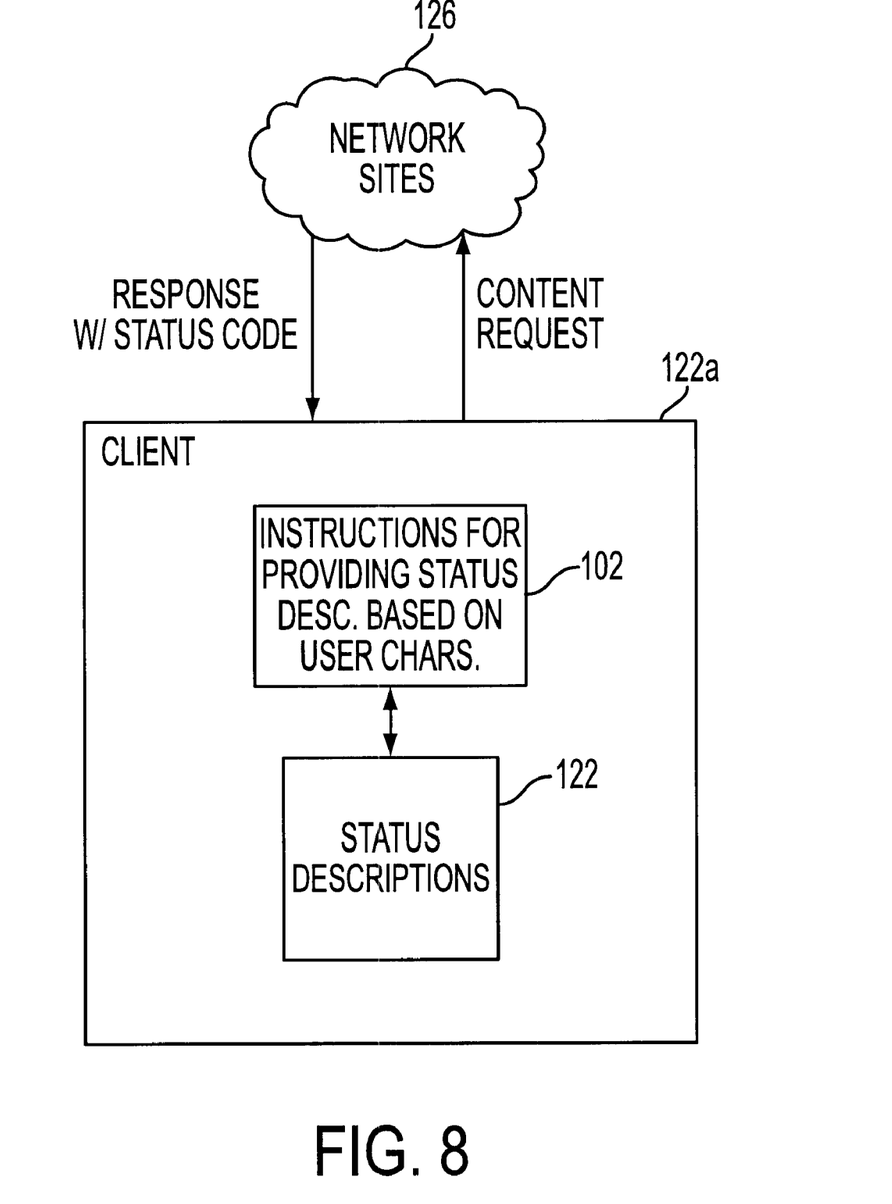
FIG. 8 is a diagram of a client that provides status information in a user's preferred language.

Referring to FIG. 8, the instructions for providing a status description based on user characteristics 102 also can reside in a client 122 instead of in an intervening agent. When the client 122 receives an information request response, the client 122 can determine the status of the information request. The client 122 then can provide a status description tailored to the user (e.g., in language(s) preferred by the user). The selected description then can be displayed by a browser or other application providing network services.

The methods and techniques described here may be implemented in digital electronic circuitry, or in computer hardware, firmware, software, or in combinations of them. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. For example, the functions and components shown in FIGS. 7 and 8 can be distributed across multiple computers. Accordingly, other embodiments are within the scope of the following claims.

What is claimed is:

1. A method of providing a network communication status description based on user comprehension characteristics, the method comprising:

receiving a status indication from a first networked computer in response to a user's request for information;

determining one or more comprehension characteristics of the user who issued the request;

selecting a first status description from a plurality of status descriptions based upon the one or more comprehension characteristics and the status indication wherein the plurality of status descriptions include the first status description that corresponds to a first received status indication and a first set of determined comprehension characteristics and a second status description that corresponds to the first received status description and a second set of determined comprehension characteristics; and providing the first status description.

2. The method of claim 1, further comprising transmitting the first status description to a second networked computer.

3. The method of claim 1, wherein the status indication comprises an indication of the success or failure of the user's request.

4. The method of claim 1, wherein the status indication comprises a status code.

5. The method of claim 4, wherein the status code comprises an HTTP (HyperText Transfer Protocol) status code.

6. The method of claim 1, wherein the one or more comprehension characteristics comprise technical proficiency.

7. The method of claim 6, wherein the determining the one or more comprehension characteristics comprises inferring a level of technical proficiency.

8. The method of claim 7, wherein inferring a level of technical proficiency comprises inferring a level of technical proficiency based on a user's previous request or requests for information.

9. The method of claim 1, wherein the one or more comprehension characteristics comprise one or more preferred languages.

10. The method of claim 9, wherein the determining the one or more comprehension characteristics of the user comprises inferring the preferred language.

11. The method of claim 10, wherein inferring a preferred language comprises determining a user's address.

12. The method of claim 10, wherein inferring a preferred language comprises determining an access number used by the user.

13. The method of claim 1, wherein the first status description comprises text.

14. The method of claim 1, wherein the first status description comprises speech.

15. The method of claim 1, wherein the first status description comprises at least one of the following: graphics, video, animation, sound and instructions.

16. The method of claim 1, wherein the user's request comprises an HTTP request for a resource.

17. A method of providing a network communication status description based on user comprehension characteristics, the method comprising:

receiving an HTTP (HyperText Transfer Protocol) status code from a first networked computer in response to a user's HTTP request for a URL (Universal Resource Locator) provided by the first networked computer;

determining one or more comprehension characteristics of the user who issued the request;

selecting a first status description from a database storing a plurality of status descriptions based on the received HTTP status code and the determined user comprehension characteristics wherein the plurality of status descriptions include the first status description that corresponds to a first received HTTP status code and a first set of determined comprehension characteristics and a second status description that corresponds to the first received HTTP status code and a second set of determined comprehension characteristics; and transmitting the first status description to a second networked computer.

18. The method of claim 17, wherein the one or more comprehension characteristics comprise user technical proficiency.

19. The method of claim 17, wherein the one or more comprehension characteristics comprise one or more preferred languages of the user.

20. A proxy for providing a network communication status description based on user comprehension characteristics, the proxy comprising:

means for receiving a status code from a first networked computer in response to a user's request for information;

means for determining one or more comprehension characteristics of the user who issued the request;

means for selecting a first status description from a database storing a plurality of status descriptions based on the received status code and the determined user comprehension characteristics wherein the plurality of status descriptions include the first status description that corresponds to a first received status code and a first set of determined comprehension characteristics and a second status description that corresponds to the first received status code and a second set of determined comprehension characteristics; and means for transmitting the first status description to a second networked computer.

21. The method of claim 20, wherein the one or more comprehension characteristics comprise user technical proficiency.

22. The method of claim 20, wherein the one or more comprehension characteristics comprise one or more preferred languages of the user.

* * * * *

UNITED STATES PATENT AND TRADEMARK OFFICE
CERTIFICATE OF CORRECTION

PATENT NO. : 6,353,855 B1
DATED : March 5, 2002
INVENTOR(S) : C. Hudson Hendren III It is certified that error appears in the above-identified patent and that said Letters Patent is hereby corrected as shown below:

<u>Column 8,</u>
Line 12, delete "method" insert -- proxy --; after "The"; and
Line 15, delete "method" insert -- proxy -- after "The".

Signed and Sealed this

Twenty-ninth Day of October, 2002

*Attest:*

*Attesting Officer*

JAMES E. ROGAN
*Director of the United States Patent and Trademark Office*